United States Patent [19]

Havas et al.

[11] 3,954,909

[45] May 4, 1976

[54] METHOD OF PRODUCING SOLID POLYMERS

[75] Inventors: Lazlo J. Havas; Pierre M. Mangin, both of Martigues, France

[73] Assignee: Naphtachimie, Paris, France

[22] Filed: July 16, 1973

[21] Appl. No.: 379,454

Related U.S. Application Data

[63] Continuation of Ser. No. 148,191, May 28, 1971, abandoned.

[30] Foreign Application Priority Data

June 9, 1970 France .............................. 70.21067

[52] U.S. Cl. .................... 260/878 B; 260/878 R; 526/75; 526/120; 526/122; 526/148; 526/155; 526/158; 526/201; 526/348; 526/352; 526/934; 526/68

[51] Int. Cl.² .................... C08F 2/14; C08F 255/00; C08F 10/02

[58] Field of Search .......... 260/878, 94.9 D, 49.9 B, 260/93.7

[56] References Cited

UNITED STATES PATENTS

| | | | |
|---|---|---|---|
| 3,475,517 | 10/1969 | Renaudo | 260/878 B |
| 3,514,501 | 5/1970 | Leibson et al. | 260/878 B |

FOREIGN PATENTS OR APPLICATIONS

| | | | |
|---|---|---|---|
| 1,550,186 | 12/1968 | France | 260/94.9 D |
| 1,010,627 | 11/1965 | United Kingdom | 260/94.9 D |

*Primary Examiner*—Alan Holler

[57] ABSTRACT

A method for producing solid polymers having a molecular weight greater than 50,000 from olefins wherein the olefin is polymerized in the absence of a liquid dispersion agent of a nature different from that of the olefin to be polymerized, and in contact with a prepolymer containing a small amount of transition metal of subgroups IV-b, V-b and VI-b having been produced by the polymerization of an olefin in a dispersion liquid containing a Ziegler-type catalyst.

10 Claims, No Drawings

METHOD OF PRODUCING SOLID POLYMERS

This is a continuation of application Ser. No. 148,191, filed May 28, 1971, now abandoned.

This invention relates to a method of polymerizing olefins from a prepolymer in the absence of a liquid dispersion agent which is different in nature from that of the olefins to be polymerized.

It is current practice in the industry to effect the polymerization of olefins under a low pressure, by means of a so-called Ziegler catalytic system, which comprises a compound of a metal of subgroups IV-b, V-b, or VI-b of the Periodic Table of elements, that metal being in most cases titanium, and a reducing agent, such as an organo aluminum compound. In this method, polymerization is effected in a liquid dispersion agent, commonly called a solvent, which is generally a hydrocarbon or a mixture of saturated hydrocarbons. After polymerization, the dispersion agent is recovered and, before it is recycled in a subsequent operation, it must be subjected to a complex and expensive purification treatment.

In order to limit this disadvantage, it has already been proposed that polymerization should be commenced in a dispersion agent, in the presence of a catalytic couple comprising titanium tetrachloride and an organo aluminum compound, then allowing the dispersion agent to escape from the reaction medium; polymerization is then continued in the same apparatus on the polymer mass formed, which progressively dries up as the dispersion agent evaporates. This method suffers, however, from a number of disadvantages: titanium tetrachloride and organo aluminum compounds, which are volatile substances, are to a major extent entrained by the dispersion agent as it evaporates. In practice, to maintain acceptable polymerization speeds, it is necessary to periodically introduce into the reaction medium fresh quantities of the catalytic couple. Moreover, the polymer mass, in the course of drying out, has a tendency to agglomerate owing to its sticky nature and polymerization in practice rapidly stopped inside such agglomerates.

The concepts of the present invention reside in a method of polymerizing olefins, which method is carried out in the absence of any liquid dispersion agent which is of a nature different from that of the olefins to be polymerized.

The invention, therefore, concerns a method of producing solid polymers, having generally a molecular weight of more than 50,000, from olefins having the formula $CH_2=CHR$, wherein R is hydrogen or an alkyl radical having up to 8 carbon atoms (e.g., methyl, ethyl, isopropyl, butyl, etc.), this method comprising polymerizing said olefins in the absence of a liquid dispersion agent of a nature different from that of the olefins to be polymerized, and in contact with a prepolymer containing from 500 to 10,000 ppm of transition metals belonging to subgroups IV-b, V-b and VI-b of the Periodic Table of elements, said prepolymer being produced by the polymerization of an olefin in a dispersion liquid containing a catalytic system comprising at least one compound of a transition metal as defined above and at least one organic compound of a metal of groups II and III of the Periodic Table of elements, the resulting prepolymer being separated from the dispersion liquid and then subjected to an extraction operation by means of an anhydrous solvent. The transition metals belonging to subgroups IV-b, V-b and VI-b of the Periodic Table of elements comprise titanium, vanadium, chromium, zirconium, niobium, molybdenum, hafnium, tantalum, wolfram, thorium and uranium.

The prepolymer according to the invention is preferably prepared by the polymerization of an olefin under a pressure of less than 20 bars, in a liquid saturated hydrocarbon and in the presence of a catalytic system comprising:

a. one or more titanium compounds having the mean formula $Ti(OR)_m X_{p-m}$, wherein R represents an alkyl group having from 1 to 8 carbon atoms (e.g., methyl, ethyl, isopropyl, etc.), X represents a halogen, preferably chlorine, p represents 3 or 4 or a fraction between 3 or 4, and m represents an integer or a fraction between O and p; and b. one or more organo aluminum compounds having the formula $AlRnX_{3-n}$ wherein R represents hydrogen and/or an alkly group having from 1 to 8 carbon atoms, X represents a halogen, preferably chlorine, and n represents an integer or a fraction of from 1 to 3.

In this catalytic system, the molecular ratio between the organo aluminum compounds and the titanium compounds is from 1 to 20.

It has been found that the properties of the polymers which are finally obtained are to a major degree conditioned by the conditions of preparation of the prepolymer; for this reason, the catalytic system used is selected within the definition given above, from systems which, if they are used in a polymerization operation which is entirely effected in the presence of a dispersion liquid and with the olefin in question, would make it possible to obtain satisfactory reaction conditions and would also result in polymers having the desired quality.

It has also been found that it is advantageous for the titanium compounds used to be a titanium compound in which the metal is of a valency of less than 4. Thus, for example, good results are obtained in the polymerization of ethylene by means of a catalytic system comprising a titanium compound substantially corresponding to the formula $TiCl_3$ and obtained by the reduction of titanium tetrachloride by an organo aluminum compound, and by a trialkyl aluminum having the formula $AlR_3$, R being an alkyl radical containing from 2 to 8 carbon atoms.

The dispersion agent used in the preparation of the prepolymer is selected from those used in the production of polyolefins under low pressure; different aliphatic or cycloaliphatic hydrocarbons, such as n-butane, n-pentane, n-hexane, n-heptane or isooctane can be suitable, as well as mixtures of aliphatic and/or cycloaliphatic hydrocarbons, such as petroleum spirits which are distilled at from 35° to 250°C. The amount of dispersion agent used is linked in practice with the amount of prepolymer produced. For reasons of convenience in agitating the medium in which the prepolymer is formed, it is desirable to use the dispersion agent in an amount which is equal by weight to at least double the amount of prepolymer to be formed. In practice, ratios by weight of dispersion agent to prepolymer of the order of 2.5 times were found satisfactory.

Preparation of the prepolymer is stopped when from about 5 to 100 g. of prepolymer have been formed per millimole of transition metal compounds of the catalyst. This stoppage can be simply effected by loading the reaction vessel at the beginning with the amount of olefin to be prepolymerized, or by stopping the introduction of olefin. The reactor is then cleared, such as by means of a stream of inert gas, and then the prepolymer is separated from the dispersion agent, for example, by means of distillation or preferably by means of filtration or decantation of the dispersion agent.

The prepolymer is then subjected to an extraction operation using an anhydrous solvent, such as an aliphatic or cycloaliphatic hydrocarbon. In practice, it is desirable to use as the extraction agent a hydrocarbon or mixture of hydrocarbons of the same nature as the hydrocarbon or hydrocarbons used as the dispersion agent in the preparation of the prepolymer. Extraction is preferably effect at a temperature of from 25° to 120°C., by lixiviation or simply by suspending the prepolymer in the solvent, followed by decantation of the prepolymer and removal of the exhausted solvent.

It is preferably to effect a number of successive extraction steps, the prepolymer being left in contact each time with the solvent for a number of minutes. Operation is stopped when the extraction agent no longer gives any deposit upon cooling. In all, amounts of solvent of the order of from 2 to 8 ml/g of prepolymer are generally sufficient for this operation. Once the extraction operation is completed, the prepolymer is re-suspended in a small amount of the solvent, in which there is dissolved an activating agent comprising at least one organic compound of a metal of groups II and III of the Periodic Table of elements. This activating agent is preferably an organo aluminum compound which is introduced in a molecular ratio of from 1 to 20 with respect to the transition metal compounds present in the prepolymer. The solvent is then evaporated under vacuum. The resulting prepolymer can be used immediately in the manufacture of the polymer or can be stored for a number of weeks.

It is essential to perform the operations in the sequence as described above, which comprises the preparation of the catalytic system, prepolymerization, extraction and storage of the prepolymer under air-tight and moisture-proof conditions, in order not to damage the catalytic system.

It was found that the operation described above, which comprises subjecting the prepolymer to an extraction step using a solvent, gives the result of creating a certain degree of porosity within the particles of the prepolymer. This porosity can be determined in particular by measuring the specific surface area by means of the B.E.T. method of a prepolymer which has simply been dried, and the same prepolymer which has been subjected to the extraction operation beforehand. The specific surface area of the former of these prepolymers substantially corresponds to the external surface area of the particles, and can be, for example, 0.1 sq.m/g., whereas the specific surface area of the corresponding treated prepolymer exceeds 1 sq.m/g.

The creation of this porosity in the prepolymer gives rise to extremely important effects. The activating agent added at the end of the extraction step is capable of penetrating into the deep interior of the particles of the prepolymer, which enables polymerization in the following operation to take place at least partially within the prepolymer particles. In addition, it was found that it was not necessary, during the polymerization operation, to add supplementary quantities of catalyst into the apparatus, as the speed of polymerization did not decrease excessively during the polymerization operation. On the contrary, when a prepolymer which has been prepared as described above, but which has not undergone an extraction step, is used in polymerization, it was noted that the speed of polymerization decreased very rapidly and for that reason it was necessary periodically to add catalytic components to the polymerization apparatus. Moreover, the use of a prepolymer which has been previously subjected to an extraction step, makes it possible largely to avoid polymer agglomerates being formed in the polymerization apparatus, which is an important advantage as such agglomerates cause difficulties in carrying out the method and because they also result in heterogenous polymers being formed.

The polymer is then used in the polymerization step proper, during which it is brought directly into contact with the olefin to be polymerized, in the absence of liquid dispersion agents, such as saturated hydrocarbons. This operation is advantageously performed in accordance with the procedure known as the "fluidized bed method" in which the olefin to be polymerized circulates in a gaseous condition upwardly in a column containing a layer of prepolymer which is expanded and fluidized by the gas flow. The olefin to be polymerized is introduced into the apparatus at a temperature such that the reaction medium is at least at a temperature of 60°C. and with advantage at a temperature of about 80°C., and under a feed pressure which is slightly higher than that of the gas above the fluidized bed, so as to compensate for the charge losses in the fluidized bed. As it passes through the bed, a part of the olefin is polymerized in contact with the prepolymer, the particles of which progressively increase in size.

The fraction of olefin which is not polymerized, issues from the fluidized bed and passes into a cooling system which is intended to remove the heat produced during the polymerization, before preferably being recycled to the fluidized bed apparatus.

In the circuit forming the fluidized bed apparatus, the gas cooling system and the devices for circulating the gas in the circuit, the olefin to be polymerized can be at a mean pressure which is close to atmospheric pressure or preferably, at a pressure which is markedly higher, and which can attain, for example, 30 bars, in order to increase the speed of polymerization.

Polymerization is stopped when the polymer reaches the desired means molecular weight which is generally from 100,000 to 1,000,000. In order to achieve better control of this molecular weight, it is possible when preparing the prepolymer and in the polymerization step proper, to mix the olefin to be polymerized with a chain limiter such as hydrogen, in a hydrogen/olefin molecular ration which is, for example, from 10 to 80%.

In some cases, in particular when the amount of prepolymer used in the polymerization step is small, it may be desirable to mix this prepolymer with the polymer which has already been formed, issuing from a previous operation, so that the fluidized bed polymerization operation can be begun on an amount of solid materials which corresponds to a layer which is at least 10 cm in height.

If necessary, the resulting polymer can be treated in order to remove the remains of catalyst which it contains, using the conventional methods of treating polyolefins. However, it is possible to use the method of the invention with high-productivity catalytic couples, such as couples of the type $TiCl_3$, $AlR_3$, wherein R is an alkyl radical containing from 2 to 8 carbon atoms, for the polymerization of ethylene; the resulting polymers which contain, for example, less than 100 ppm of titanium can be used directly without any purification treatment.

The method of the invention can be used in a single olefin, such as ethylene or propylene, or with a plurality of olefins either in mixtures or in successions. Thus, for example, it is possible to prepare a prepolymer from propylene and to continue polymerization with ethylene.

However, the invention is particularly applicable to the polymerization of ethylene, in particular with the high-productivity catalytic couples already mentioned. The resulting polyethylene is in the form of substantially spherical and independent granules, of which the diameter is a few hundreds of microns, the diameter depending on the degree of polymerization. Their grain sizes lie within narrow limits, and their appearance is superior to that of polyethylenes produced by polymerization in the presence of a dispersion agent, as they are generally without any splits or cavities.

Having described the basic concepts of the invention, reference is now made to the following examples which are provided by way of illustration, and not by way of limitation, of the preparation of a prepolymer containing the transition metal and the use of same in the polymerization of olefins.

EXAMPLE 1

1 liter of n-heptane, 80 millimoles of diethylchloroaluminum and 6 millimoles of a titanium trichloride obtained by the reduction of titanium tetrachloride by an organo aluminum compound, are successively introduced into a stainless steel reaction vessel of 5 liters, which is provided with a mechanical agitator and a heating device. Hydrogen is then introduced until the pressure is 1.5 bar and then, the reaction medium being heated to 75°C., ethylene is introduced at a rate of 150 g. per hour. After 2 hours of reaction, the prepolymer is dried mechanically, and then subjected to two successive extraction steps using a total of 2 liters of boiling heptane, each portion of heptane being separated by decantation. Before the last decantation step, 500 ml. of heptane containing 20 millimoles of diethylchloroaluminum is added, and then the solvent is evaporated. 300 g. of a prepolymer which is brown in color, has a mean grain size of 150 microns and contains 960 ppm of titanium is obtained.

125 g. of this prepolymer is then introduced into a fluidized bed reaction vessel formed by a tube made of "Pyrex" glass measuring 10 cm in diameter and provided at its lower end with a plate which is apertured with four holes of 0.3 mm diameter per square centimeter.

The reaction vessel is heated to 80°C., and the prepolymer is fluidized by means of a rising flow of ethylene at a rate of 7 cm/sec under a relative pressure of 3 bars. The unconverted ethylene is cooled in an external cooler, and then recycled to the fluidized bed reaction vessel by means of a compressor. After 18 hours of polymerization, 1100 g. of a polyethylene having a mean grain size of 350 microns is obtained.

The catalytic yield is 440 g. of polymer per millimole of titanium, and the means speed of polymerization is 24.6 g. per millimole of titanium and per hour.

EXAMPLE 2

Operation is as in Example 1, except that the catalytic system comprises 50 millimoles of sesquiethylchloroaluminum, 30 millimoles of titanium trichloride and 10 millimoles of tetrabutyltitanate.

Fluidized bed polymerization from 60 g. of prepolymer on the 300 g. obtained is effected. After 10 hours of polymerization, 900 g of a polyethylene having a mean grain size of 200 microns is collected. The catalytic yield is 106 g. of polymer per millimole of titanium and the mean speed of polymerization is 10.5 g. per millimole of titanium and per hour.

EXAMPLE 3

A prepolymer is prepared as in Example 1, except that the catalytic system comprises 7 millimoles of titanium trichloride and 7 millimoles of triethylaluminum. The ethylene which is introduced is polymerized at a speed of 100 g. per hour. After 2 hours 30 minutes, 250 g. of a prepolymer is obtained, which is subjected at a temperature of 80°C. to extraction steps using a total of 2 liters of solvent. After the last extraction step, 500 ml. of heptane containing 17.5 millimoles of triethylaluminum is added, then the solvent is removed by distillation under vacuum.

35 g. of the prepolymer and 250 g. of a powder polyethylene from another preparation operation, the polyethylene having a grain size close to that of the prepolymer, are introduced into a steel fluidization reaction vessel which is 11 cm in diameter. The bed is brought into a fluidized state by means of a stream of ethylene at a rate of 10 cm/sec at a pressure of 15 bars. The unreacted ethylene is cooled and then recycled into the reaction vessel in which the temperature is maintained at 80°C. After 5 hours, 1300 g. of polymer is collected, which corresponds to a catalytic yield of 1050 g. of polymer per millimole of titanium and to a mean speed of polymerization of 210 g. of polymer per millimole of titanium and per hour.

The polymer obtained is in the form of spherical granules which are about 450 microns in diameter.

EXAMPLE 4

A prepolymer is prepared as in the previous example, except that triethylaluminum is replaced by equivalent molecular amounts of triisobutylaluminum.

29 g. of the prepolymer which is mixed with 500 g. of inert polymer, is subjected to a fluidized bed polymerization step at 80°C. and at a pressure of 20 bars. After 4 hours of polymerization, 2420 g. of polymer is obtained, which corresponds to a catalytic yield of 2400 g. of polymer per millimole of titanium and to a mean speed of polymerization of 600 g. of polymer per millimole of titanium and per hour.

The polymer obtained is in the form of spherical granules which are about 600 microns in diameter.

EXAMPLE 5

Operation is as in Example 3, except that triethylaluminum is replaced by equivalent molecular amounts of trioctylaluminum.

22 g. of the prepolymer, mixed with 500 g. of inert polymer, is subjected to a fluidized bed polymerization operation at 80°C. and under a pressure of 20 bars. After 6 hours of polymerization, 1800 g. of polymer is collected, which corresponds to a catalytic yield of 2020 g. of polymer per millimole of titanium and to a mean speed of polymerization of 337 g. of polymer per millimole of titanium and per hour.

The polymer obtained is in the form of spherical granules which are about 560 microns in diameter.

It will be understood that various changes and modifications may be made in the details of procedure, formulation and use without departing from the spirit of the invention, especially as defined in the following claims.

We claim:

1. A method for producing solid polymers of a molecular weight of more than 50,000 from olefins having the formula $CH_2=CHR$, wherein R is a hydrogen atom or an alkyl radical having a maximum of 8 carbon atoms comprising polymerizing the olefins in the absence of liquid dispersion agent of a nature different from that of the olefins to be polymerized, and in contact with a prepolymer containing from 500 to 10,000 ppm of a transition metal selected from the group consisting of subgroups IV-b, V-b and VI-b of the Periodic Table of elements, said prepolymer having a specific surface area of at least 1 m²/g being produced by the polymerization of an olefin in a dispersion liquid containing a catalytic system comprising at least one compound of a transition metal as defined above and at least one organic compound of a metal of groups II and III of the Periodic Table of elements, the resulting prepolymer then being separated from the dispersion liquid and subjected to an extraction operation by means of an anhydrous solvent to increase the surface area to at least 1 m²/g, and impregnating the resulting prepolymer with at least one organic compound of a metal of Groups II and III.

2. A method as claimed in claim 1 wherein the prepolymer is prepared by the polymerization of an olefin at a pressure of less than 20 bars in a liquid saturated hydrocarbon and in the presence of a catalytic system comprising: (a) one or more titanium compounds having the mean formula $Ti(OR)_m X_{p-m}$, wherein R represents an alkyl group having 1 to 8 carbon atoms, X represents chlorine, bromine or iodine, p represents 3 or 4 or a fraction between 3 and 4, and m represents an integer or a fraction between O and p; and (b) one or more organo aluminum compounds having the formula $AlRnX_{3-n}$, wherein R represents a hydrogen atom or an alkyl group having from 1 to 8 carbon atoms, X represents chlorine, bromine or iodine and n represents an integer or a fraction of from 1 to 3.

3. A method as defined in claim 1 wherein the prepolymer is separated from the dispersion liquid and then subjected to an extraction treatment by means of an anhydrous solvent at a temperature of from 25° to 120° C and then re-suspended in a small amount of solvent in which there is dissolved an activating agent comprising at least one organic compound of a metal of groups II and III of the Periodic Table of elements, before being dried.

4. A method as claimed in claim 1 wherein polymerization is effected by passing the olefin to be polymerized upwardly in a gaseous state through a bed of the prepolymer in a fluidized condition, at a temperature of at least 60° C., the unreacted olefins being cooled and then recycled to the fluidized bed.

5. A method as claimed in claim 1 wherein the prepolymerization and/or polymerization steps are effected in the presence of a chain limiter.

6. A method as claimed in claim 1 wherein the olefin is ethylene to be polymerized.

7. A method as claimed in claim 2 wherein the mole ratio between the organo aluminum compound and the titanium compound is within the range of 1 to 20.

8. A method as defined in claim 1 wherein the prepolymer is prepared by the polymerization of an olefin in a catalytic system comprises $TiCl_3$ and trialkyl aluminum having the formula $AlR_3$ wherein R is an alkyl group containing 2–8 carbon atoms.

9. A method as defined in claim 1 wherein the olefin is contacted with the prepolymer in the form of particles suspended in a fluidized bed.

10. A method for producing solid polymers of a molecular weight of more than 50,000 from ethylene comprising polymerizing ethylene in the absence of a liquid dispersion agent of a nature different from ethylene, and in contact with a prepolymer containing 500–10,000 ppm of a titanium compound, said prepolymer having specific surface area of at least 1 m²/g and being produced by the polymerization of ethylene in a dispersion liquid containing a catalyst system comprising at least one organo aluminum compound and at least one titanium compound, the resulting prepolymer then being separated from the dispersion liquid and subjected to an extraction operation with an anhydrous solvent to increase the surface area to at least 1 m²/g and impregnating the resulting prepolymer with at least one organo aluminum compound.

* * * * *